United States Patent
Garcia et al.

(10) Patent No.: US 6,780,341 B2
(45) Date of Patent: Aug. 24, 2004

(54) APPARATUS AND METHOD FOR ENHANCING THE UNIFORM ETCHING CAPABILITY OF AN ION BEAM GRID

(75) Inventors: David Garcia, San Jose, CA (US); Cherngye Hwang, San Jose, CA (US); Uriel Ortiz, San Jose, CA (US); Nick K. Karmaniolas, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/635,059

(22) Filed: Aug. 6, 2003

(65) Prior Publication Data

US 2004/0026375 A1 Feb. 12, 2004

Related U.S. Application Data

(62) Division of application No. 10/252,963, filed on Sep. 13, 2000, now Pat. No. 6,663,747.

(51) Int. Cl.$^7$ .......................... C23F 1/00; H01L 21/00; H05H 1/00
(52) U.S. Cl. .......................... 216/66; 216/63; 438/712; 156/345.39
(58) Field of Search .............................. 216/94, 66, 63; 438/712, 714, 717; 156/345.39, 345.3; 118/723 FL

(56) References Cited

U.S. PATENT DOCUMENTS

| | | |
|---|---|---|
| 4,450,031 A | 5/1984 | Ono et al. |
| 4,523,971 A | 6/1985 | Cuomo |
| 4,684,848 A | 8/1987 | Kaufman et al. |
| 4,877,479 A | 10/1989 | McNeil et al. |
| 5,159,508 A | 10/1992 | Grill et al. |
| 5,741,404 A | 4/1998 | Cathey |
| 6,250,250 B1 | 6/2001 | Maishev et al. |
| 6,419,803 B1 | 7/2002 | Baldwin et al. |

FOREIGN PATENT DOCUMENTS

| | | | | |
|---|---|---|---|---|
| JP | 10317138 A | * | 12/1998 | ........... C23C/14/46 |
| JP | 2000011905 A | * | 1/2000 | ........... H01J/27/02 |

* cited by examiner

Primary Examiner—Parviz Hassanzadeh
(74) Attorney, Agent, or Firm—William D. Gill; Dillon & Yudell LLP

(57) ABSTRACT

A shaper for an ion beam gun has a thin, flat plate with a non-symmetrical profile including notches and tabs. The shaper is mounted to the surface of an ion beam grid having an array of holes. The shaper is oriented radially on the grid and covers some of the holes in the grid. The grid is mounted to an ion beam gun above a specimen that is rotated beneath the ion beam gun. The ion beam is filtered into smaller ion beamlets by the grid. The ion beamlets permeate the holes in the grid that are not covered by the shaper. The ion beamlets reach the specimen to etch it more uniformly than a grid that does not have a shaper. The shaper may be further optimized for a particular grid via a trial-and-error process to even further refine the uniformity of etching depth.

4 Claims, 3 Drawing Sheets

APPARATUS AND METHOD FOR ENHANCING THE UNIFORM ETCHING CAPABILITY OF AN ION BEAM GRID

This Divisional Application claims the priority of parent application Ser. No. 10/252,963, filed on Sep. 13, 2000 now U.S. Pat. No. 6,663,747, and entitled "Apparatus and Method for Enhancing the Uniform Etching Capability of an Ion Beam Grid".

BACKGROUND OF THE INVENTION

1. Technical Field

The present invention relates in general to an improved magnetic head slider fabrication process, and in particular to a method and apparatus for increasing uniformity of the air bearing surface (ABS) of a slider. Still more particularly, the present invention relates to a method and apparatus for improving the capacity of an ion beam grid to uniformly etch an ABS specimen.

2. Description of the Prior Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. Disks are rigid platters, typically made of aluminum alloy or a mixture of glass and ceramic, covered with a magnetic coating. Typically, two or three disks are stacked vertically on a common spindle that is turned by a disk drive motor at several thousand revolutions per minute (rpm).

The only other moving part within a typical HDD is the head stack assembly. Within most HDDs, one magnetic read/write head or slider is associated with each side of each platter and flies just above or below the platter=s surface. Each read/write head is mounted on a suspension to form a head gimbal assembly (HGA). The HGA is then attached to a semi-rigid arm apparatus that supports the entire head flying unit. Several semi-rigid arms may be combined to form a single armature unit.

Each read/write head scans the surface of a disk during a Aread@ or Awrite@ operation. The head and arm assembly is moved utilizing an actuator that is often a voice coil motor (VCM). The stator of a VCM is mounted to a base plate or casting on which the spindle is also mounted. The base casting is in turn mounted to a frame via a compliant suspension. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop directly over the desired track.

In a typical magnetic head slider fabrication process, ion milling has been one of the more popular techniques to form an air bearing surface (ABS) on the slider. The ABS allows the slider to be flown very close to a disk in order to retrieve or rewrite information in the disk. With the increasing demand on storage density, fly height (i.e., the altitude that the slider flies at relative to the disk) has become the most critical parameter to differentiate drive performance. In order to have sufficient control of the fly height, the etch depth uniformity of the ABS must be improved beyond the present tooling capacity.

As graphically illustrated in FIG. 1, the etch depth uniformity of a specimen 11 is typically controlled by an ion beam etching device 13 via a grid 15 formed from a durable material such as molybdenum. Specimen 11 is rotated as shown on a table 17 about its center, or grid 15 is rotated relative to specimen 11. Grid 15 is mounted to a stationary ion beam gun 19 directly above specimen 11. Grid 15 has a large number of symmetrically spaced-apart holes 21 and voids 22 that are free of holes 21 (see FIG. 2). The center 23 of grid 15 is concentric with the center of specimen 11. As specimen 11 is rotated, ion gun 19 emits a large axially-directed beam 25 onto the upper surface of grid 15 such that a grid filters beam 25 and small ion beamlets 27 permeate each of holes 21 to etch specimen 11. Although it is possible to redesign the grid using complicated ion optics theories in order to enhance the etch depth uniformity of the ABS, this solution is difficult and relatively expensive. Thus, an improved apparatus and method for increasing the uniformity of ABS etching depth is needed.

SUMMARY OF THE INVENTION

A shaper for an ion beam gun is a thin, flat plate having a generally elongated, non-symmetrical profile with notches and tabs. The shaper is mounted flat to the surface of an ion beam grid having an array of holes. The shaper is oriented radially on the grid from its center to a perimeter of the grid and covers some of the holes in the grid. The grid is mounted to an ion beam gun above a specimen that is rotated beneath the ion beam gun. The large ion beam is filtered into smaller ion beamlets by the grid. The ion beamlets permeate the holes in the grid that are not covered by the shaper. The ion beamlets reach the specimen to etch it more uniformly than a grid that does not have a shaper. This phenomena is due to blockage of the higher ion beam density along the radial direction. The ion beamlets that ultimately arrive at the specimen are themselves more uniform and can produce the more uniform pattern on the specimen. The shaper may be further optimized for a particular grid via a trial-and-error process to even further refine the uniformity of etching depth.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

Figure 1:
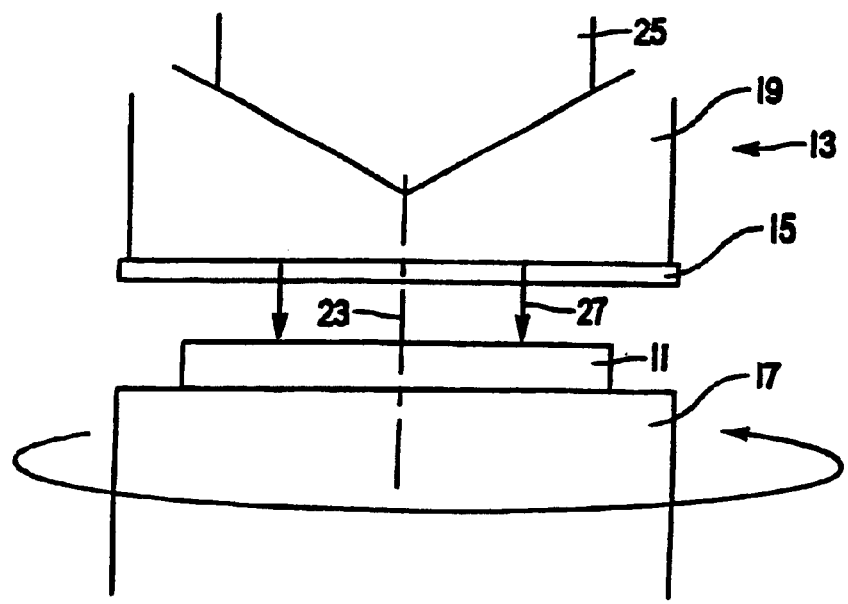
FIG. 1 is a schematic side view of a prior art ion beam etching device in operation.
Figure 3:
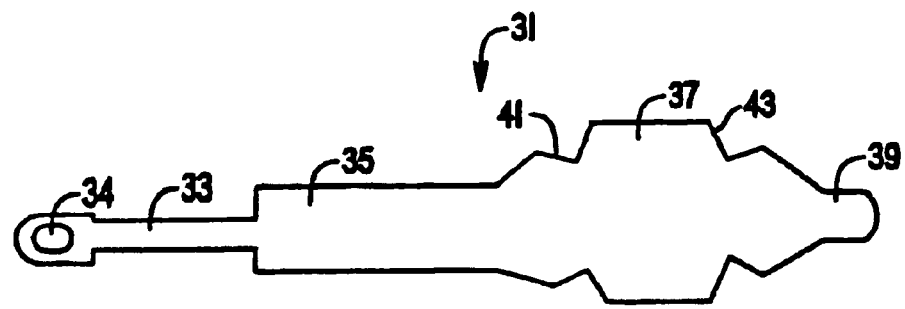
FIG. 3 is a plan view of a first embodiment of an ion beam grid shaper constructed in accordance with the invention.

Referring to FIG. 3, a first embodiment of a shaper 31 for an ion beam gun, such as the one illustrated and described in FIG. 1, is shown. Shaper 31 is essentially a thin, flat sheet or plate formed from a durable material such as molybdenum. In the preferred embodiment, shaper 31 is formed from the same material as the ion beam grid that the ion beam grid will be attached to. Shaper 31 is also uniquely shaped for the particular application of its design and, thus, is precisely customized via an empirical or trial-and-error process. Shaper 31 has an elongated neck portion 33 with a mounting hole 34, a generally rectangular front portion 35, and a bulkier mid-section 37 that generally tapers to a small tail portion 39. Mid-section 37 typically has a unique, non-symmetrical profile including notches 41 and tabs 43 that increase ion beam etching uniformity.

Figure 4:
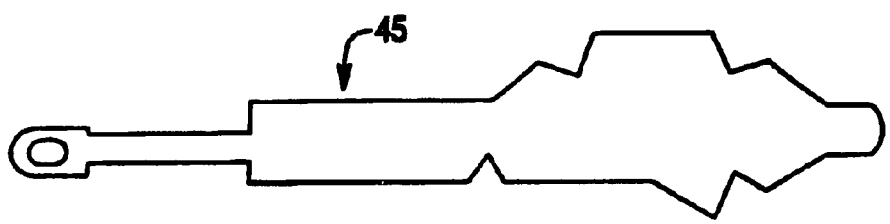
FIG. 4 is a plan view of a second embodiment of an ion beam grid shaper constructed in accordance with the invention.
Figure 5:
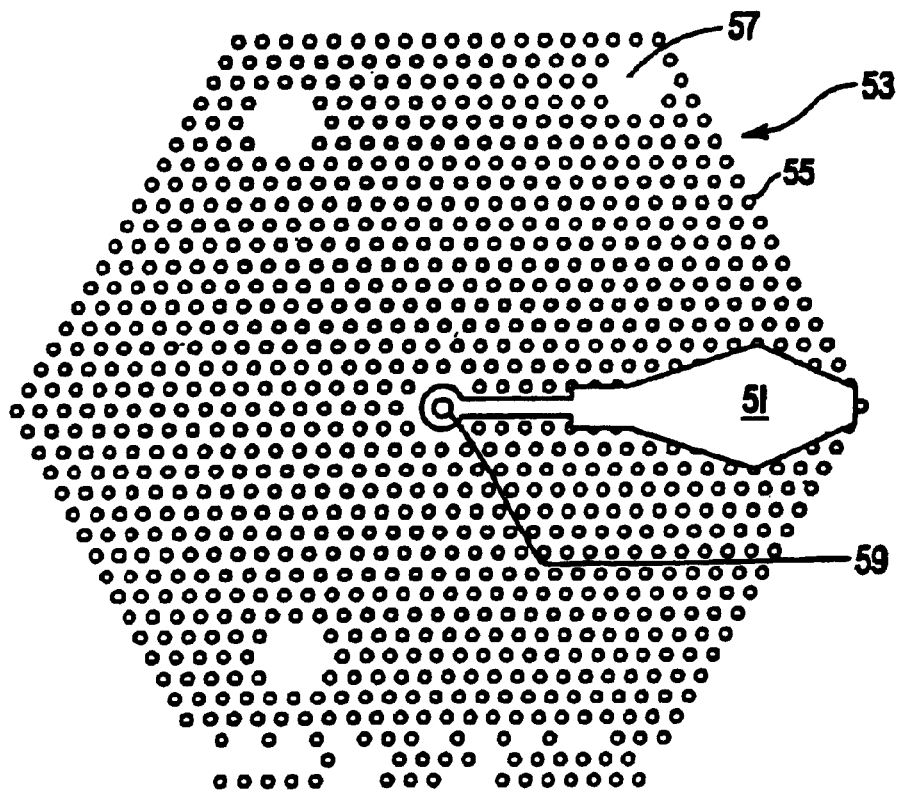
FIG. 5 is a plan view of a third embodiment of an ion beam grid shaper constructed in accordance with the invention and shown mounted to a grid.

A second illustrative embodiment of shaper 31 is depicted in FIG. 4 as shaper 45. Shaper 45 is substantially similar to shaper 31 including neck, front, middle, and tail portions, but has a slightly different geometry as shown.

Although Ashapers@ are widely used in ion beam sputter deposition or direct ion beam deposition to achieve uniform deposition, those prior art devices differ significantly from the present invention that is mounted directly to the ion beam gun itself. The shaper used in deposition is typically in front of the substrate being deposited. By manipulating the shaper position relative to the incoming flux of depositing material, the thickness uniformity of the resultant film may be improved. This type of shaper is used in DC, RF sputtering, as well as ion beam sputter deposition systems. However, it is not suitable for etching uniformity because the shaper would be etched away and become a source of contamination. The present invention places the shaper inside the ion gun, such that no such concern exists.

In operation, a third illustrative embodiment of a shaper 51 is shown mounted directly to an ion beam grid 53 having a large plurality of holes 55 and voids 57 that are free of holes 55. The surface area of shaper 51 is relatively small compared to the overall surface area of grid 53 and typically covers less than 5% of grid, preferably 1 to 5% thereof. Shaper 51 may be secured to either the upper or lower surface of grid 53 via a number of different fastening methods including screws. The hole 59 in the neck portion of shaper 51 is aligned and fastened to the center of grid 53. The remainder of the body of shaper 51 covers a radial swath of grid 53 and extends from the center of grid 53 to a perimeter thereof and is secured with an appropriate number of fastening mechanisms. In this version, the mid-section and tail portion of shaper 51 are used to cover one of the voids 57 in grid 53. With shaper 51 rigidly attached to grid 53, a significant number of the holes 55 in grid 53 (but less than 5%) are covered or sealed. The geometry of shaper 51 is determined by the etch depth profile along the radial direction of grid 53.

Grid 53 is then mounted to the lower end of a stationary ion beam gun (see FIG. 1) which is located directly over a rotatable table supporting an ABS specimen. Grid 53 may be parallel to the specimen or skewed relative thereto. As the table rotates the specimen concentrically beneath the gun, ion beamlets permeate the holes 55 in grid 53 that are not covered by shaper 51. The ion beamlets that are allowed to reach the specimen etch a more uniform ABS on the specimen than a grid 53 that is not configured with a shaper 51. This phenomena is due to the blockage of the higher ion beam density along the radial direction. The ion beamlets that ultimately arrive at the specimen are themselves more uniform and, thus, produce an even more uniform pattern on the specimen. Since shaper 51 reduces the ion beam density emanating from grid 53, there is a reduction in the total beam intensity and a concomitant reduction in the etching rate (about 5%) at a given beam power. However, a much better uniformity is achieved. Shaper 51 may be further optimized for grid 53 via an empirical or trial-and-error process to even further refine the uniformity of etching depth.

Figure 2:
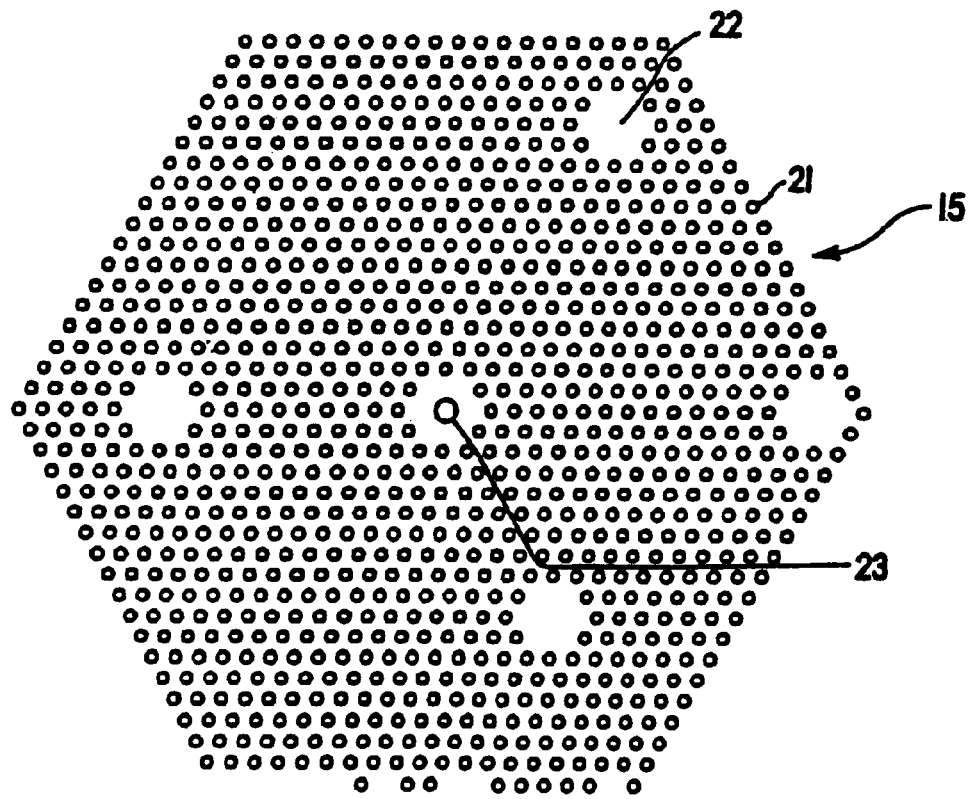
FIG. 2 is a plan view of a prior art ion beam grid used by the device of FIG. 1.
Figure 6:
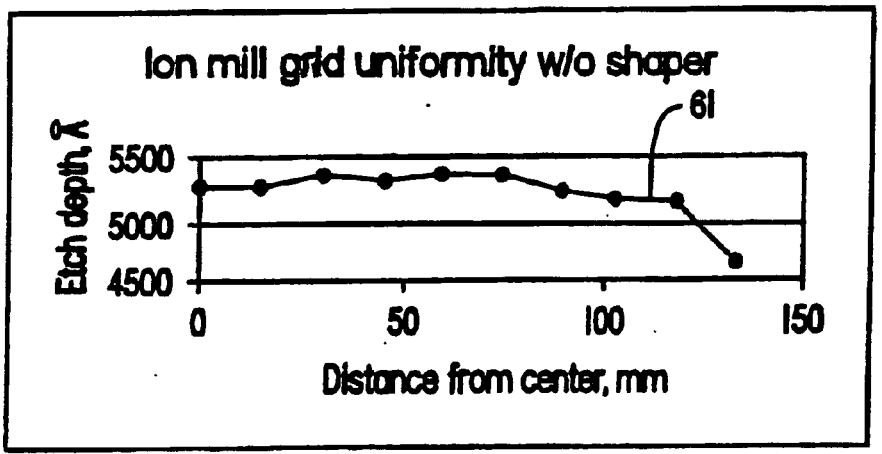
FIG. 6 is a plot of etch depth uniformity on a specimen etched with a prior art grid.

Referring now to FIG. 6, an illustrative plot 61 of the surface uniformity of the specimen 11 etched by grid 21 of FIG. 2 is shown. The vertical axis of FIG. 6 depicts the vertical dimension or depth (in angstroms) of the etching in the surface of specimen 11, and the horizontal axis depicts the radial distance (in millimeters) from the center of specimen 11. In other words, plot 61 is essentially an enhanced cross-sectional view of specimen 11 that schematically illustrates the flatness and uniformity of its ABS. The average etch depth of specimen 11 is 5,215 angstroms with a standard deviation of 214 angstroms or 4.1%.

Figure 7:
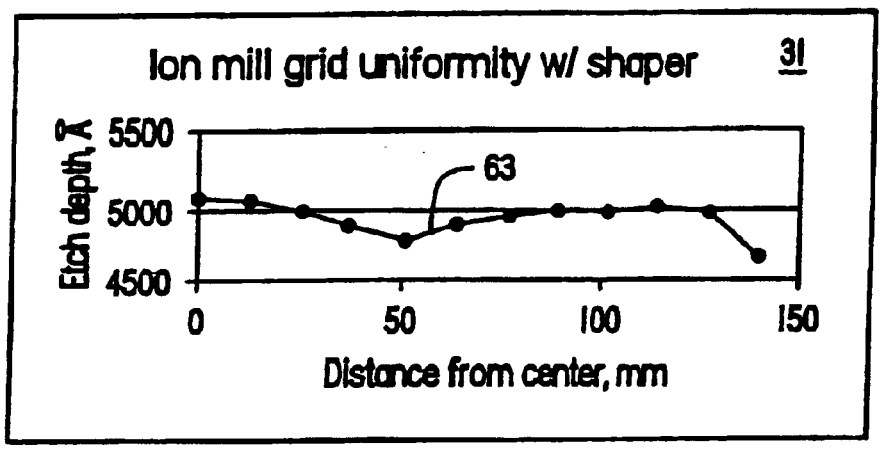
FIG. 7 is a plot of etch depth uniformity on a specimen etched with a grid equipped with the shaper of FIG. 3.

FIG. 7 is a plot 63 of the surface uniformity of a specimen etched by a grid equipped with shaper 31 of FIG. 3. The vertical and horizontal axes of FIG. 7 are the same as for FIG. 6. The average etch depth of the specimen etched via shaper 31 is 4,918 angstroms with a standard deviation of 108 angstroms or 2.2%. This is a significant improvement over the previous grid 21 having no shaper. Shaper 31 reduced the standard deviation by almost half compared to the prior art apparatus and method. Although shaper 31 was a significant improvement, it overcompensated the middle portion of the ion beam by blocking too many beamlets in this area. Thus, shaper 45 of FIG. 4 was designed to further refine shaper 31.

Figure 8:
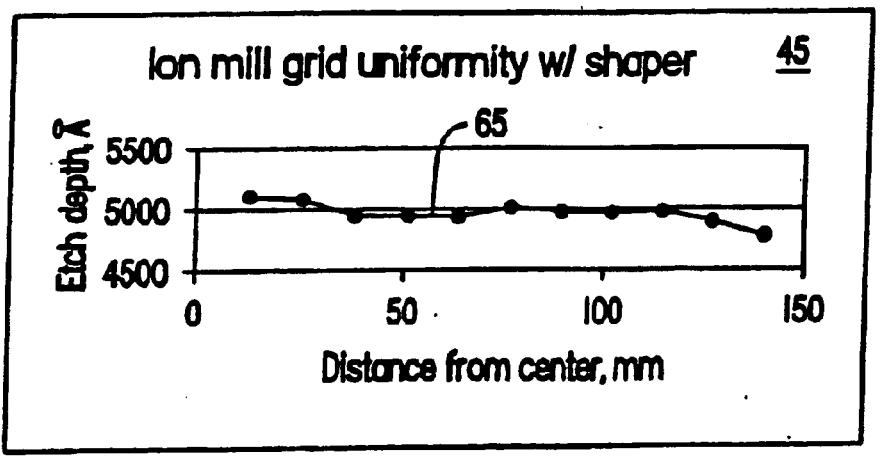
FIG. 8 is a plot of etch depth uniformity on a specimen etched with a grid equipped with the shaper of FIG. 4.

FIG. 8 is a plot 65 of the surface uniformity of a specimen etched by a grid equipped with shaper 45. The average etch depth of the specimen etched via shaper 45 is 4,966 angstroms with a standard deviation of 85 angstroms or 1.7%. This is an even greater improvement over prior art grid 21 having no shaper, and over a grip equipped with shaper 31. Shaper 45 offers an improvement of about 58% over grid 21, and about 23% over shaper 31. As stated previously, a shaper may be further optimized for a particular grid via trial-and-error to even further refine the uniformity of etching depth.

The invention has several advantages. The apparatus and method disclosed above improves etch depth uniformity with a shaper that can be optimized without redesigning the ion beam grid using complicated ion optics theories. The shaper of the present invention blocks the higher density beam portions to achieve a more uniform ion beam and, thus, a more uniform etch. The shaper of the present invention improves the etching depth uniformity of an ion beam gun by over 50% in some applications.

While the invention has been shown or described in only some of its forms, it should be apparent to those skilled in the art that it is not so limited, but is susceptible to various changes without departing from the scope of the invention.

What is claimed is:

1. A method of etching a specimen, comprising the steps of:
   (a) providing an ion beam gun with a grid having a surface with a plurality of holes extending through for filtering a ion beam emitted by the gun;
   (b) supporting the specimen adjacent to the gun and rotating one of the specimen and the gun relative to the other;
   (c) omitting an ion beam from the gun through the grid and toward the specimen; and
   (d) blocking at least some of the holes in the grid by covering a radial swath of the grid from a center of the grid to a perimeter of the grid such that the ion beam emitted by the gun is prevented from passing therethrough for improving an etch depth uniformity of the specimen.

2. The method of claim 1 wherein step (d) comprises mounting a plate to the surface of the grid to block said at least some of the holes.

3. The method of claim 1 wherein step (d) comprises blocking approximately 1 to 5% of the holes in the grid.

4. The method of claim 1, wherein step (b) comprises rotating the specimen relative to the gun.

* * * * *

UNITED STATES PATENT AND TRADEMARK OFFICE
CERTIFICATE OF CORRECTION

PATENT NO. : 6,780,341 B2
DATED : August 24, 2004
INVENTOR(S) : Garcia et al.

It is certified that error appears in the above-identified patent and that said Letters Patent is hereby corrected as shown below:

Column 5,
Lines 10-11, please replace with the following text:
-- emitting an ion beam from the gun through the grid and toward the specimen; and --.

Signed and Sealed this

Twenty-seventh Day of September, 2005

JON W. DUDAS
*Director of the United States Patent and Trademark Office*